United States Patent
Beranger et al.

(10) Patent No.: US 7,360,411 B2
(45) Date of Patent: Apr. 22, 2008

(54) DETECTION OF REVOLUTIONS OF A TIRE AND WHEEL ASSEMBLY BY MEANS OF THE EARTH'S MAGNETIC FIELD

(75) Inventors: Marc Beranger, St. Martin D'Uriage (FR); Christian Jeandey, St. Egreve (FR)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 11 days.

(21) Appl. No.: 11/296,911

(22) Filed: Dec. 8, 2005

(65) Prior Publication Data
US 2006/0152212 A1     Jul. 13, 2006

Related U.S. Application Data

(63) Continuation of application No. PCT/EP2004/006332, filed on Jun. 11, 2004.

(30) Foreign Application Priority Data
Jun. 16, 2003   (FR) ................................. 03 07234

(51) Int. Cl.
G01M 17/02   (2006.01)
(52) U.S. Cl. ....................................................... 73/146
(58) Field of Classification Search ................ 324/165; 73/146; 156/64
See application file for complete search history.

(56) References Cited

U.S. PATENT DOCUMENTS

| | | | |
|---|---|---|---|
| 4,300,390 A | 11/1981 | Shimizu | |
| 4,339,713 A | 7/1982 | Kago et al. | |
| 5,562,787 A | 10/1996 | Okamoto et al. | |
| 6,265,867 B1 | 7/2001 | Fowler | |
| 6,498,474 B1 | 12/2002 | Turner | |
| 6,543,279 B1 | 4/2003 | Brown et al. | |
| 2003/0001563 A1 | 1/2003 | Turner | |

FOREIGN PATENT DOCUMENTS

| | | |
|---|---|---|
| DE | 196 20 582 A | 11/1997 |
| DE | 101 17 920 A | 10/2002 |
| EP | 0 834 746 A | 4/1998 |

OTHER PUBLICATIONS

Search Report dated Dec. 28, 2005 for International Application No. PCT/EP2004/006332.

*Primary Examiner*—Andre J. Allen
(74) *Attorney, Agent, or Firm*—Cohen Pontani Lieberman & Pavane LLP

(57) ABSTRACT

The present invention relates to an autonomous device which is intended to be carried by a tire and wheel assembly in order to detect revolutions of said assembly, comprising at least one sensor which produces signals and an interpreter device which is connected to the sensor in order to interpret the signals produced by the sensor. The sensor is a passive sensor, the produced signals of which are proportional to the temporal variations of a magnetic flux though this sensor, and is intended to be integral in rotation with the tire such that the revolutions of said assembly correspond to the revolutions of said sensor. The invention likewise relates to an assembly provided with an autonomous device which permits detection of revolutions of the assembly, and a method for detecting revolutions of the assembly.

22 Claims, 2 Drawing Sheets

DETECTION OF REVOLUTIONS OF A TIRE AND WHEEL ASSEMBLY BY MEANS OF THE EARTH'S MAGNETIC FIELD

CROSS-REFERENCE TO RELATED APPLICATIONS

This application is a U.S. Continuation Application under 35 USC 371 of International Application PCT/EP2004/006332 filed Jun. 11, 2004.

BACKGROUND OF THE INVENTION

The present invention relates to a device which is intended to be carried by a tire and wheel assembly in order to detect revolutions of the latter. It likewise relates to a tire or a wheel carrying such a device and to a method for detecting revolutions of such an assembly.

An automotive vehicle in general comprises an odometer which permits the total distance covered by this vehicle to be known. This odometer however gives no information concerning the distance covered by each tire of the vehicle.

For example, during temporary change of tires (for example when putting on snow tires in winter) or when old worn tires are replaced, the distance displayed by the odometer no longer permits the distance actually covered by the tires to be known.

The only indication relating to the distance covered by a second-hand tire was, until a few years ago, the wear of its tread.

Tire manufacturers then had the idea of inserting a device which was integral with the tire, in the interior of the latter, and which permitted the distance covered by this tire to be known. Such devices already exist.

Amongst these devices, DE10117920 describes a magnetic field sensor which is placed on the tire and produces a signal as a function of the angular position of the tire relative to the orientation of the Earth's magnetic field.

Existing devices however have a limited lifespan because they consume a significant quantity of energy and are susceptible to vibrations.

SUMMARY OF THE INVENTION

The object of the invention is in particular to remedy these disadvantages by making available an autonomous device which is intended to be carried by a tire and wheel assembly in order to detect its revolutions, a device the lifespan of which is at least equal to that of the assembly. The device according to the invention is likewise simpler, hence more robust.

To this end, the subject of the invention is an autonomous device which is intended to be carried by a tire and wheel assembly in order to detect revolutions of said assembly, comprising at least one sensor producing signals, which is intended to be integral in rotation with the assembly, such that revolutions of said assembly correspond to revolutions of said sensor, characterized in that the sensor is a passive sensor, the produced signals of which are proportional to the temporal variations of a magnetic flux.

The device according to the invention is termed autonomous because it is self-sufficient: in order that it functions correctly, it is not necessary to place a device producing a magnetic field on the vehicle. The device of the invention utilizes the Earth's magnetic field as a fixed reference in which the tire turns. This device could thus likewise measure the distance covered by a free tire and/or a free wheel (i.e. not connected to any fixed element).

The sensor of the device is termed passive because, unlike magnetic field sensors used until now, it does not require energy in order to function. This permits the device of the invention to have greater autonomy than existing devices.

Optionally, the passive sensor of the device according to the invention can be a simple loop of conductive wire. An electrical voltage is then created in the loop by induction when it is subjected to a temporal variation of a magnetic flux. One advantage of this winding is its great robustness. In contrast to magnetic sensors used in the state of the art, which are complex and fragile sensors, a simple winding of conductive wire has a high resistance to the vibrations which are created by running on the road. It is advantageous to use a winding, the equivalent surface of which is of a maximum size and at least greater than $0.15 \text{ m}^2$. This permits sufficient sensitivity to be obtained for the sensor taking into account normal values of the Earth's magnetic field. In the opposite case, there is a risk of not detecting all the effected rotations, in particular when the vehicle is traveling at low speed or traveling in latitudes near the equator.

The device according to the invention can comprise furthermore one or more of the following features:

- the device can be sensitive to temporal variations of the magnetic flux caused by the rotation of the sensor of the device in the Earth's magnetic field;
- the sensor of the device can be intended to be placed on the tire and wheel assembly such that its direction of sensitivity is orthogonal to the axis of rotation of said assembly;
- the sensor of the device can be intended to be placed on the tire and wheel assembly such that its direction of sensitivity is orientated radially with respect to said assembly;
- the sensor can comprise a ferromagnetic core which is finely divided either made of FeNi alloy having a high permeability or made of soft ferrite;
- the sensor of the device can be intended to be placed in proximity to the bead wires of the tire (at a few centimeters at most) and a fortiori close to the rim of the wheel; in this case, in order to benefit fully from the magnetization induced by the Earth's magnetic field, it is particularly advantageous that its axis of sensitivity be orientated radially (perpendicular) relative to the axis of rotation of said assembly;
- the device can comprise a signal interpreter which produces an impulse each time it has detected at least one cycle of signals produced by the passive sensor;
- the interpreter of the device can comprise a comparator;
- the interpreter of the device can comprise filtration means for the signals produced by the sensor;
- the interpreter of the device can comprise signal amplification means;
- the device can comprise a counting means which is connected to the interpreter;
- the counting means of the device can comprise an counter which, each time it has received a predetermined number of impulses on the part of the interpreter, transmits an impulse to a micro-controller comprising storage means for the number of impulses received from the counter;
- the device can comprise a device for transmission, towards the exterior, of data which are characteristic of the number of impulses stored by the micro-controller;

the device can comprise an autonomous system of electrical supply for the electronic circuits, for example an electrochemical battery;

the interpreter of the device of the invention can add the signals of a plurality of passive sensors carried by the circumference of the tire and wheel assembly, after possibly having put them back in phase in order to take into account their angular offset on the assembly.

Preferably, the wheel of the tire and wheel assembly which is equipped with a device according to the invention comprises a steel wheel rim, it has in fact been observed that such a steel wheel rim significantly improves the performance of the device according to the invention. The bead wires of the tire or a battery of the device can also be used advantageously in order to increase the signal.

The subject of the invention is likewise a tire provided with an autonomous device intended to detect its revolutions and a wheel provided with a device intended to detect its revolutions.

The subject is also a method for detecting the revolutions of a tire and wheel assembly.

This method comprises placing on the assembly at least two sensors which produce signals proportional to the temporal variations of a magnetic flux, adding these signals and detecting the periods of the result of this addition.

In an advantageous manner, before adding the signals, they are put back in phase as a function of their relative angular positions on the assembly.

BRIEF DESCRIPTION OF THE DRAWINGS

The invention will be better understood by reading the description which follows, given solely by way of example, in the case of a device fixed to a tire, and making reference to the attached drawings in which.

DETAILED DESCRIPTION OF THE DRAWINGS

Figure 1:
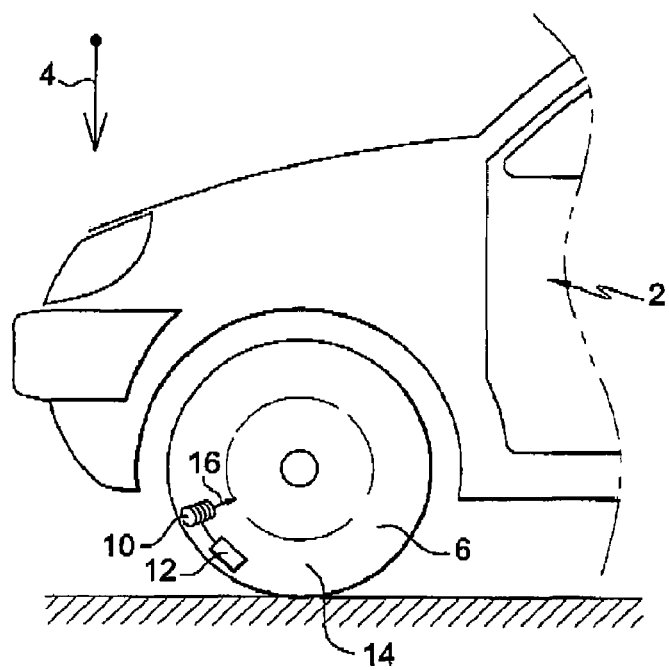
FIG. 1 is a view of the left side of an automotive vehicle, the front left tire of which is provided with a device according to the invention.

FIG. 1 represents the front of an automotive vehicle 2 which is subjected to the Earth's magnetic field 4, and the tire of the front left wheel 6 of which is equipped with a device 8 according to the invention.

The represented device comprises a sensor 10 connected to an electronic device 12 which is placed in the cover of a tire 14. The direction of sensitivity 16 of the sensor 10 is preferably radial such that, when the vehicle is moving, the direction of sensitivity of the sensor is in rotation with respect to the fixed direction of the Earth's magnetic field.

Figure 2:
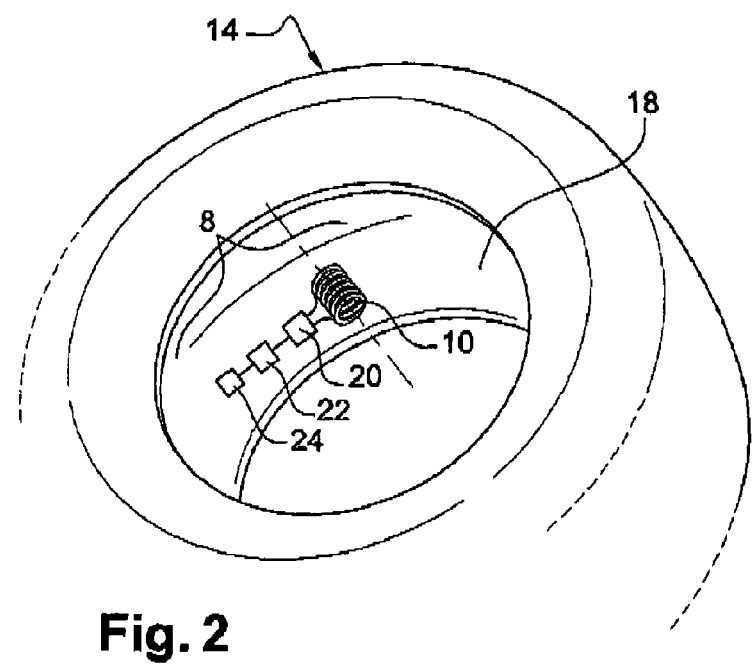
FIG. 2 is a perspective view of a tire carrying a device according to the invention.

FIG. 2 represents a tire 14, in the interior of which a device 8 according to the invention is placed. This device, placed on one of the interior sides 18 of the tire 14, comprises a sensor 10, an interpreter 20, counting means 22 and a transmission device 24.

In one particular embodiment represented in FIG. 2, the sensor 10 is a winding of conductive wire. The direction of sensitivity of the winding, which is the same as that of the axis of the winding, is orientated radially with respect to the tire 14. This winding is passive and produces a signal which is proportional to the variation of the magnetic flux which traverses it according to the Faraday-Lenz law.

The signal generated by the winding is a periodic signal, the frequency of which is equal to the frequency of rotation of the tire.

The signal generated by the winding is all the greater, the stronger and more rapid the variations of the magnetic flux traversing the windings; its amplitude thus also depends upon the speed of rotation of the winding. In one particular embodiment, the signal is integrated in order to retrieve the value of the field and to discount the speed effect.

Figure 3:
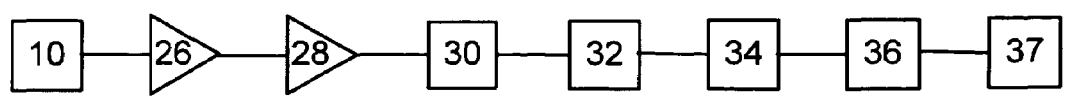
FIG. 3 is a functional diagram of a device according to the invention.

FIG. 3 is a functional diagram of a particular embodiment of a device according to the invention. The device 8 comprises a sensor 10, an amplifier 26, which permits the signals produced by the sensor to be increased if necessary, a filter 28, which permits parasitic frequential components to be suppressed and alternative exterior parasitic magnetic field sources to be rejected (for example the 50 Hz of the EDF network), a comparator which generates a pulse at each turn of the tire. The amplifier 26, the filter 28 and the comparator 30 comprise a signal interpreter. The device furthermore comprises a counter 32 with N bits, which stores the number of revolutions produced by the tire and which, when it is filled (every $2^N$ revolutions), triggers a micro-controller 34 which increases its memory by increments of one for example. The counter 32 and the micro-controller 34 form counting means. Finally, the device comprises an emission device 36 which permits transmission, towards the exterior, of data which are characteristic of the number of impulses counted by the micro-controller 34. A battery 37 supplies the electronic circuits of the device with electrical energy.

Figure 4:
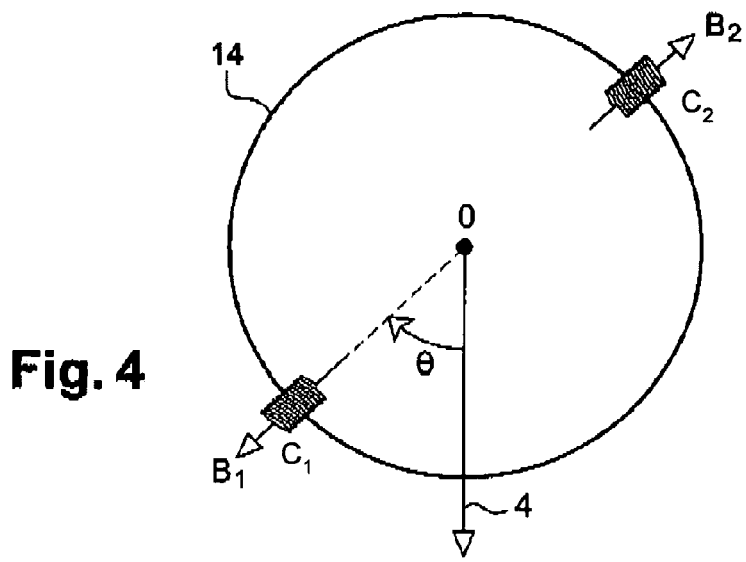
FIG. 4 is a diagram of the circumference of a tire carrying two sensors which are diametrically opposite.

FIG. 4 represents one embodiment of the invention according to which two sensors C1 and C2, which are diametrically opposite, are carried by the circumference of the tire 14. B1 and B2 are the directions of sensitivity of the sensors. This configuration permits the signal to noise ratio to be improved in the case where parasitic magnetic sources deform the signals produced by the sensors such that amplification and filtration are no longer sufficient.

Figure 5A:
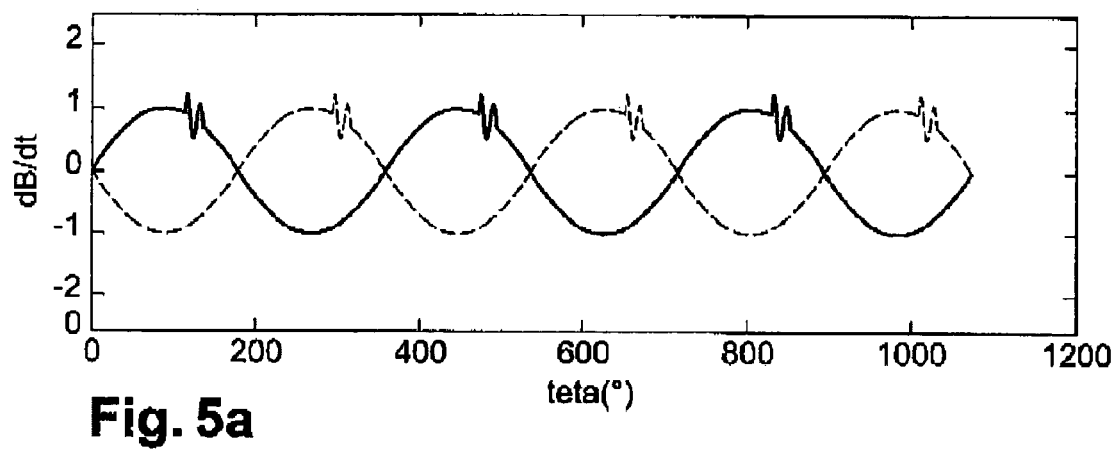
FIG. 5*a* is a graph representing the temporal signals produced by two sensors disposed according to FIG. 4.

FIG. 5*a* represents the two signals S1 and S2 produced by the two sensors of the preceding embodiment in the presence of a parasitic magnetic source. Each time a sensor passes in front of this source, a disturbance of the signal appears. As the two sensors are diametrically opposite, the two signals produced by the Earth's magnetic field are identical in phase or in opposition according to whether the sensors are wound in the same direction or in the opposite direction, as is the case in FIG. 5*a*.

Figure 5B:
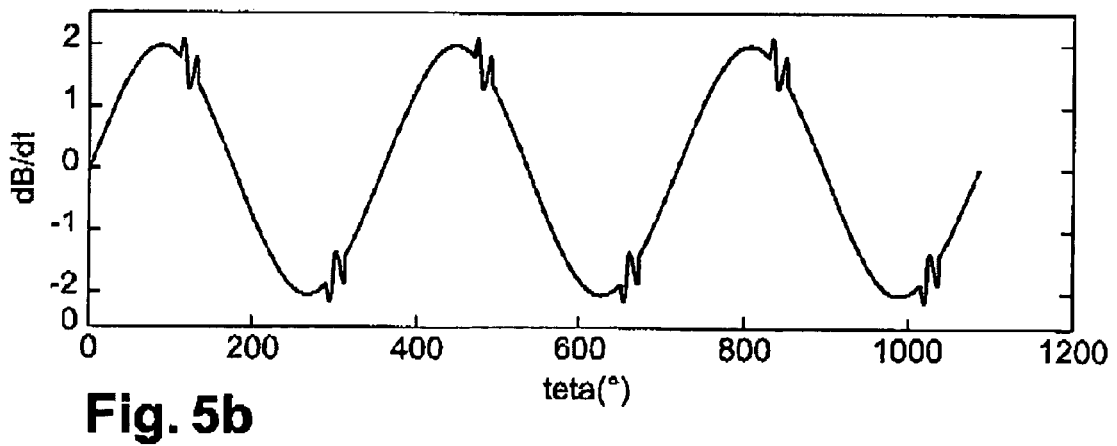
FIG. 5*b* is a graph representing the temporal signal resulting from the phase-shift and from the addition by the interpreter device of the two signals of FIG. 5*a*.

FIG. 5*b* represents the signal obtained after subtraction of the two signals. It is noted therefore that the intensity of the signal used has been doubled and that the signal to noise ratio has been multiplied by two if the signal is averaged over several periods.

The embodiments described above are given only by way of non-limiting example and could be subjected to any desirable modifications without thus exceeding the scope of the invention.

We claim:

1. An autonomous device configured to be coupled to a tire and wheel assembly to detect revolutions of the assembly, comprising:

at least one sensor for producing signals, said at least one sensor being coupled to the assembly and thereby being integral in rotation with said assembly such that revolutions of said assembly correspond to revolutions of said sensor, wherein the at least one sensor is a passive sensor, and the produced signals are proportional to temporal variations of a magnetic flux.

2. The device according to claim 1, wherein the at least one passive sensor comprises a loop of conductive wire.

3. The device according to claim 2, wherein the at least one passive sensor comprises a winding with an equivalent surface greater than 0.15 m².

4. The device according to claim 1, wherein the temporal variations of the magnetic flux to which the at least one passive sensor is sensitive are caused by the rotation of said device in the Earth's magnetic field.

5. The device according to claim 1, wherein the at least one passive sensor is coupled to said assembly such that the direction of sensitivity of the at least one passive sensor is orthogonal to the axis of rotation of said assembly.

6. The device according to claim 5, wherein the at lease one passive sensor is coupled to said assembly such that the direction of sensitivity of the at least one passive sensor is orientated radially with respect to said assembly.

7. The device according to claim 6, wherein the at least one passive sensor is disposed proximate to bead wires of the tire.

8. The device according to claim 6, wherein the at least one passive sensor disposed at the level of a crown of said tire.

9. The device according to claim 1, further comprising an interpreter which produces an impulse each time the interpreter detects at least one cycle of signals produced by the at least one passive sensor.

10. The device according to claim 9, wherein the interpreter comprises a comparator.

11. The device according to claim 10, wherein the interpreter comprises filter means for filtering the signals produced by the at least one passive sensor.

12. The device according to claim 11, wherein the interpreter comprises amplification means for amplifying the signals produced by the at least one passive sensor.

13. The device according to claim 12, further comprising a counting means coupled to the interpreter.

14. The device according to claim 13, wherein the counting means comprises a counter and a micro-controller, the micro-controller comprising a storage means, the counter after receiving a pre-determined number of impulses from the interpreter, transmits an impulse to the micro-controller, the storage means storing the number of impulses received from the counter.

15. The device according to claim 14 comprising a device for transmission of data characteristic of the number of impulses counted by the micro-controller.

16. The device according to claim 1, further comprising a plurality of passive captors disposed on the circumference of said assembly, and an interpreter configured to add the signals produced by the plurality of passive captors.

17. The device according to claim 16, wherein the interpreter is configured to put the produced signals back in phase before adding the produced signals.

18. The device according to claims 1, wherein the tire and wheel assembly comprises a steel wheel rim.

19. A wheel comprising a device according to claim 1.

20. The wheel according to claim 19, wherein the wheel is formed of steel.

21. A tire comprising a device according to claim 1.

22. A method for detecting revolutions of a tire and wheel assembly, comprising:
coupling to the tire and wheel assembly at least two sensors such that the at least two sensors rotate with, and are integral with, the tire and wheel assembly, the at least two sensors producing signals that are proportional to temporal variations of a magnetic flux;
putting the signals in phase;
adding the signals; and
detecting the periods of the result of the addition of the signals.

* * * * *